(12) United States Patent
Danko

(10) Patent No.: US 7,951,252 B2
(45) Date of Patent: May 31, 2011

(54) METHOD AND APPARATUS FOR CLOSING AN OPEN END OF A PRODUCT, AND PRODUCT FORMED THEREBY

(76) Inventor: Peter Danko, York, PA (US)

(*) Notice: Subject to any disclaimer, the term of this patent is extended or adjusted under 35 U.S.C. 154(b) by 0 days.

(21) Appl. No.: 10/674,417

(22) Filed: Oct. 1, 2003

(65) Prior Publication Data
US 2004/0060644 A1 Apr. 1, 2004

Related U.S. Application Data

(62) Division of application No. 09/774,874, filed on Feb. 1, 2001, now Pat. No. 6,655,434.

(60) Provisional application No. 60/179,387, filed on Feb. 1, 2000.

(51) Int. Cl.
*B29C 65/02* (2006.01)

(52) U.S. Cl. ........ 156/202; 156/204; 156/216; 156/221; 156/227; 156/211; 156/213; 156/212; 156/258; 428/116; 428/117; 428/119; 428/124; 428/127; 428/130; 428/192

(58) Field of Classification Search .......... 156/202, 156/479, 204, 216, 211–213, 221, 22, 227, 156/226, 258, 304.6, 308.4, 309.9, 311, 322, 156/477.1, 481, 486, 489, 492, 480; 428/186, 428/188, 116, 117, 119, 124, 127, 129, 304.4, 428/308.6, 73, 76, 121, 126, 130, 192; 52/783.11, 52/783.17

See application file for complete search history.

(56) References Cited

U.S. PATENT DOCUMENTS

| | | | |
|---|---|---|---|
| 1,930,345 A | 10/1933 | Lewis | |
| 2,278,331 A | 3/1942 | Meyercord | |
| 2,994,361 A * | 8/1961 | Gable et. al. | 264/248 |
| 3,031,356 A | 4/1962 | Bousquet et al. | |
| 3,274,315 A | 9/1966 | Kawamura | |
| 3,450,593 A | 6/1969 | Fossier et al. | |
| 3,528,873 A | 9/1970 | Scholl et al. | |
| 3,540,116 A | 11/1970 | Drahos et al. | |
| 3,579,396 A | 5/1971 | Washburn et al. | |
| 3,580,770 A | 5/1971 | Dyal | |
| 3,616,077 A * | 10/1971 | Jessee et al. | 156/479 |
| 3,616,116 A | 10/1971 | McDonald | |

(Continued)

FOREIGN PATENT DOCUMENTS

EP 0 332 602 * 9/1989

(Continued)

*Primary Examiner* — Richard Crispino
*Assistant Examiner* — Christopher Schatz
(74) *Attorney, Agent, or Firm* — Steptoe & Johnson LLP

(57) ABSTRACT

A method/apparatus closes and finishes an open end of a product that can be fused together with heat. The apparatus includes a bending stage, a fusing stage, and a pressing/cooling stage, which all can be integrally formed, with the bending stage positioned upstream of the fusing stage, and the pressing/cooling stage positioned downstream of the fusing stage. The apparatus can further include a trimming stage positioned upstream of the bending stage for preparing the ends of a panel. The product has a pair of spaced layers with edges that form an open end. Either one or both of the layers can be heated and rolled toward the other layer while being heated so that they contact and fuse together. The layers can overlap and fuse at their contact surfaces, or the edges can abut to form a butt joint, or the edges can overlap slightly.

24 Claims, 6 Drawing Sheets

U.S. PATENT DOCUMENTS

| | | | |
|---|---|---|---|
| 3,630,806 A * | 12/1971 | Kitajima et al. | 156/472 |
| 3,701,707 A | 10/1972 | Scholl et al. | |
| 3,785,908 A | 1/1974 | Wagers et al. | |
| 3,788,920 A | 1/1974 | Frappier et al. | |
| 3,792,951 A | 2/1974 | Meyers | |
| 3,806,389 A | 4/1974 | Gwynne | |
| 3,929,536 A * | 12/1975 | Maughan | 156/85 |
| 3,998,679 A | 12/1976 | Gwynne | |
| 4,145,236 A | 3/1979 | Neumayer et al. | |
| 4,201,609 A * | 5/1980 | Olsen | 156/85 |
| 4,347,955 A | 9/1982 | Kamal | |
| 4,356,053 A * | 10/1982 | LoMaglio | 156/499 |
| 4,385,090 A | 5/1983 | Sims | |
| 4,507,348 A * | 3/1985 | Nagata et al. | 428/172 |
| 4,539,065 A | 9/1985 | Schmitt | |
| 4,606,784 A * | 8/1986 | Glans et al. | 156/200 |
| H556 H * | 12/1988 | Tarko | 156/379.8 |
| 4,891,085 A | 1/1990 | Mulligan | |
| 4,985,106 A * | 1/1991 | Nelson | 156/276 |
| 5,069,738 A * | 12/1991 | Ruemeli et al. | 156/444 |
| 5,091,038 A | 2/1992 | Greller et al. | |
| 5,240,527 A | 8/1993 | Lostak et al. | |
| 5,246,516 A | 9/1993 | Rias | |
| 5,384,002 A * | 1/1995 | Leatherman et al. | 156/500 |
| 5,545,279 A * | 8/1996 | Hall et al. | 156/201 |
| 5,658,644 A * | 8/1997 | Ho et al. | 428/188 |
| 5,709,053 A | 1/1998 | Kuroda | |
| 6,037,033 A * | 3/2000 | Hunter | 428/72 |

FOREIGN PATENT DOCUMENTS

| | | | |
|---|---|---|---|
| JP | 5-177752 | * | 7/1993 |

* cited by examiner

METHOD AND APPARATUS FOR CLOSING AN OPEN END OF A PRODUCT, AND PRODUCT FORMED THEREBY

CROSS-REFERENCE TO RELATED APPLICATIONS

This is a Divisional Application of application Ser. No. 09/774,874, filed on Feb. 1, 2001 and issued as U.S. Pat. No. 6,655,434 B2 on Dec. 2, 2003, which claims priority from U.S. Provisional Application No. 60/179,387, filed Feb. 1, 2000.

This application claims priority to provisional application Ser. No. 60/179,387 filed Feb. 1, 2000, and incorporates the disclosure thereof in its entirety.

BACKGROUND

Fluted or corrugated panels have a wide range of applications. They are generally used as an economical alternative to solid sheet panels, as they have an extraordinary strength to weight ratio, with much greater insulating properties than solid sheet panels—that is if the ends of the fluted panels are closed. The fluted panels, which can be extruded from high-density polypropylene or polyethylene are more durable than corrugated fiberboard, lighter than wood, and impervious to water and can withstand harsh chemicals. For instance, fluted thermoplastic panels can be used to form reusable containers and boxes, displays, screen printings, automotive interior components, storage cabinets, walls, supports, etc. Transparent fluted panels also can be used as skylights, wall dividers, etc.

Such a fluted panel typically comprises a pair of spaced apart thermoplastic layers or skins interconnected with longitudinally extending ribs or flutes that form longitudinally extending interior passageways, as illustrated in U.S. Pat. No. 5,658,644, the disclosure of which is incorporated herein by reference. The flutes are uniformly spaced apart and run in one direction for the entire length or width thereof. The flutes, however, can run in any direction and can be angled. The cross section of the panel having perpendicular flutes looks like a series of side-by-side square tubes having open ends, which will allow air, liquid or any material to flow freely inside the length of the panel. Such fluted panels are commercially available from INTEPLAST GROUP, LTD of Livingston, N.J. (sold under the name of IntePro®, as advertises at http://www.worldpak.com) and COROPLAST, INC. of Dallas, Tex. (sold under the name of Coroplast™, as advertises at http://www.coroplast.com). These companies manufacture thermoplastic panels in various sizes and thickness, ranging from 2 mm to 13 mm, with the skin thickness ranging from 6.5 mil to 36 mil and the flute thickness ranging from 6.5 mil to 29 mil. These panels, however, come with open ends (at four sides for square or rectangular shape), which limit their use.

The problem with open ends is that they allow dirt and water to collect inside. Moreover, the open edges can be sharp, making it unsuitable for consumer use, as the sharp edges can catch and scratch skin and clothing. Further, the open edges can be unsightly, making it esthetically undesirable. Thus, it would be desirable to close the open ends. Indeed, properly closing and sealing the ends and making them more esthetically appealing would greatly extend the use of such panels. The insulating and inert (non-reactive) properties of sealed thermoplastic panels are highly desirable qualities. Because the extruded polypropylene is highly non-reactive, it is qualified for medical use, which makes the panels an excellent candidate for food, pharmaceutical, medical storage, and packaging applications. Presently these thermoplastic panels have limited uses, as there is not an economical solution for sealing and finishing the edges. Other markets that could benefit from the fluted panels if the edges are sealed are, for example, storage, cabinetry, casework, and furniture industries.

Currently there are two methods of finishing or sealing the ends of extruded plastic materials. The first finishing method is covering the open ends with either an unlike or like material. This first method involves fitting the panels in U-shaped channels. An example of this is the current method for finishing skylights and divider panels, where the open ends are capped with U-shaped channels of like material. This method is labor intensive and may need to rely on bonding agents to securely attach the channels. The bonding alternative is not only expensive, it requires a long curing period, and the result is not all that esthetically pleasing.

The second method involves heating and stamping the flat sheets at the portion of the skins that overlap with a die to press and fuse them together. This method seals the edges together very well. But the tooling required to make the die is very expensive and limited to a single shape. This method makes shorter productions unpractical. This method is also not suited for producing esthetically pleasing ends for consumer products because the resulting ends are fairly sharp, which can scratch skin and clothing.

Accordingly, there is a need for an economical solution for producing an esthetically pleasing end in the current fluted panels. The present invention addresses this need.

SUMMARY

The present invention relates to a method and an apparatus for closing an open end of a product, and the product formed thereby. The product, which can be a panel, such as a fluted thermoplastic panel, including those made of polypropylene, polyethylene, polycarbonate, etc., has a first layer with a first end and a second layer with a second end. The first layer is spaced apart from the second layer and the first and second ends define an open end of the product. The first and second layers are heat sealable, weldable, or fusable.

The method comprises the step of rolling at least the first layer toward the second layer and contacting the first layer with the second layer, and fusing the first and second layers by heating at least one of a portion of the first layer that contacts the second layer and a portion of the second layer that contacts the first layer. The rolling step can include overlapping the first layer over the second layer or contacting an edge of the first layer to an edge of the second layer.

The rolling step also can include rolling both the first and second layers so that edges of the first and second layers contact each other, or the edges can be made to abut each other, or so that the first layer overlaps and contacts the second layer.

The fusing step can include heating both portions of the first and second layers that contact each other, and both portions can be simultaneously heated.

The present method also can include a step of trimming at least the second layer so that the first layer extends beyond the second layer to form a tab. The tab can be dimensioned to overlap the second layer. The first and second layers can also be trimmed so that the first and second layers extend substantially equally.

The present method also can include a step of pressing and cooling the fused layers.

The apparatus can include a pair of first and second guides, and a heater. The first and second guides can be configured to contact and guide at least the first layer and cause the first layer to contact the second layer, while one of the first and second guides and the product is moved relative to the other of the first and second guides and the product. The heater can heat one or both of the guides to heat and melt at least one of a contact portion of the first layer that contacts the second layer and a contact portion of the second layer that contacts the first layer, so that the contact portions fuse upon contact.

In one embodiment, the first and second guides can be configured to contact and guide the first layer to cause the first layer to overlap the second layer. In this respect, the heater can be configured to heat only the first guide, and the first guide can be configured to simultaneously heat both contact portions of the first and second layers that are fused. The first guide can comprise a body having a first guide surface and a second guide surface. The first guide surface can be configured to contact the contact portion of the first layer and the second guide surface configured to contact the contact portion of the second layer.

The second guide can be positioned adjacent to the first guide surface. The second guide can have a complementary guide surface that is configured complementary to the first guide surface. The first guide surface and the complementary guide surface can be configured to sandwich the contact portion of the first layer.

In another embodiment, the first and second guides can be configured to contact and guide the first layer to cause an edge of the first layer to contact an edge of the second layer.

In another embodiment, both the first and second guides can be configured to contact and guide both the first and second layers to cause edges of the first and second layers to contact each other. The edges can be made to abut each other or slightly overlap. In this respect, the first guide can be configured to simultaneously heat both contact portions of the first and second layers. The heater can be configured to heat only the first guide to a temperature sufficient to melt the both contact portions. The second guide also can be configured to contact an outer side of the second layer and guide only the second layer.

In yet another embodiment, the first and second guides can be configured to contact and guide both the first and second layers to cause the first layer to overlap and contact the second layer. Here, the first guide can be configured to contact and simultaneously heat both contact portions of the first and second layers, and the heater can be configured to heat only the first guide to a temperature sufficient to melt the both contact portions.

The second guide can be configured to contact an outer side of the first layer and guide only the first layer. The second guide also can be configured complementary to the first guide surface so that the first and second guides sandwich the first layer.

The present apparatus can further include a pressing and cooling stage for at least cooling a fused seam.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

DETAILED DESCRIPTION

Although the present description refers to directions in describing the drawings, they are made relative to the drawings as normally viewed. The directions, such as upper, lower, etc., and the identifiers, such as first, second, etc., are not intended to be taken literally or limit the present invention in any form. Such directions are used here merely for convenience of description in relation to the drawings, and such identifiers are used here solely to keep track of different elements having similar names.

The present method and apparatus are designed to close an open end of a product, which has a pair of spaced layers 2, 3 having ends that are open or free, i.e., open end. The present method and apparatus can be used with any product that has an open end formed by relatively thin members and are heat sealable, fusable, or weldable. One example of such a product is the fluted panel having the configuration disclosed in the Background.

Figure 1:
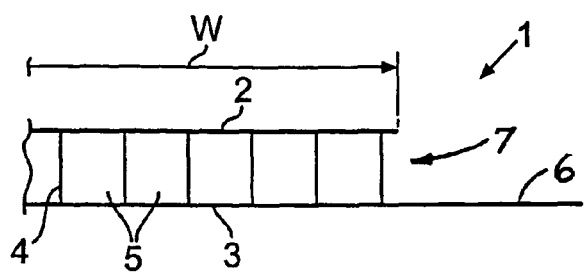
FIG. 1 schematically illustrates a side profile of a typical fluted panel, with the upper layer trimmed so that its open end can be closed according to the present invention.
Figure 10:
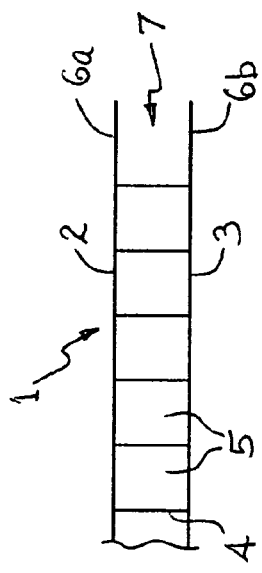
FIG. 10 schematically illustrates a side profile of the fluted panel similar to FIG. 1, but trimmed to have equal length tabs.
Figure 12A:
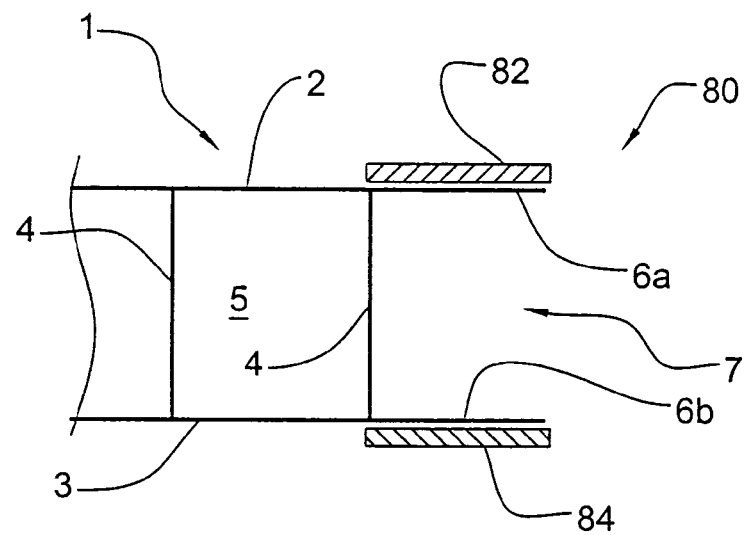
FIG. 12A schematically illustrates a side profile of the fluted panel similar to FIG. 10, but with shorter equal length tabs for a butt (edge) or slight edge overlap fusing, and a fusing stage just before it contacts and guides the tabs.

Referring to FIGS. 1, 10, and 12A, such a panel 1 typically comprises a pair of upper and lower spaced apart layers or skins 2, 3. A plurality of longitudinally extending ribs or flutes 4 interconnect or join the upper and lower layers 2, 3 and form a plurality of longitudinally extending interior passageways 5. The panel 1 can have a precut or indefinite length, which can be defined as running parallel to the flutes 4 or passageways 5. The width W of the panel 1 can be defined here as the distance running perpendicular to the flutes 4 or passageways 5. The width can also run indefinitely or be precut. The panel 1 has at least one open end 7 running along its length or width—it does not matter which the width or length rungs as the present invention is applicable to closing any open end. The commercially sold IntePro® and Coroplast™ panels discussed above have four open ends running along both edges of its length and width, and are made of either polypropylene or polyethylene.

Although the present invention is applicable to close and finish any product that can be heat fused, as mentioned above, for purposes of describing the present invention, the IntePro® and Coroplast™ panels have been selected and schematically illustrated in FIGS. 1-6, 10-10C, and 12A-12C.

One aspect of the present invention is an apparatus 100 for closing an open end of a product, such as a fluted panel 1. The apparatus 100 can include a bending stage 10 and a fusing stage 20. In alternative embodiments, the apparatus 100 can omit the bending stage 10 and include a rolling/fusing stage 60, 80. These apparatuses can further include a pressing/cooling stage 50, 70, 90. They can further include a trimming stage (not illustrated) positioned at a leading end side (relative to the panel 1) of the bending stage 10 or the rolling/fusing stage 60, 80 for preparing the open end 7 of the panel 1. All of these stages can be integrated on a platform or the like so that the entire apparatus 100 can be moved relative to the panel 1. In this respect, the apparatus 100 can be movably and rotatably positioned on a track (not illustrated) relative to the panel 1. The panel 1 can be positioned in a fixed position with a vacuum device or clamp, or the like, on a support, or be conveyed. The apparatus 100 can be maintained at a fixed position, while the panel 1 is conveyed or moved using a conventional conveying system, while the panel 1 is maintained in alignment with the apparatus 100, and vice-versa.

Figure 12B:
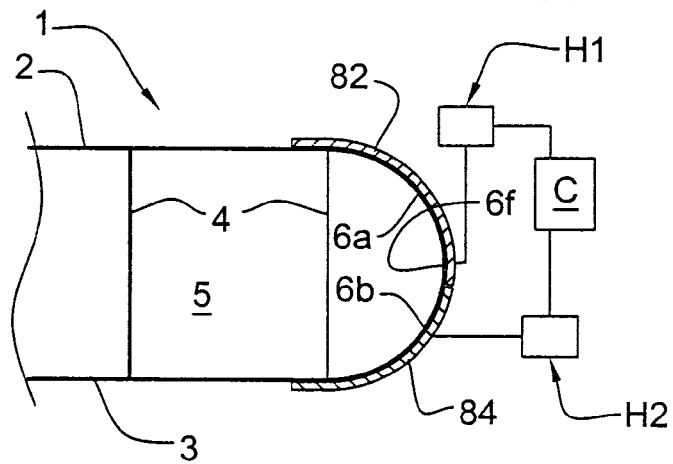
FIG. 12B schematically illustrates a side profile of the fluted panel of FIG. 12A, with the fusing stage at a different position, where it guides the tabs so that their edges are in an abutting or slightly overlapped configuration.
Figure 12C:
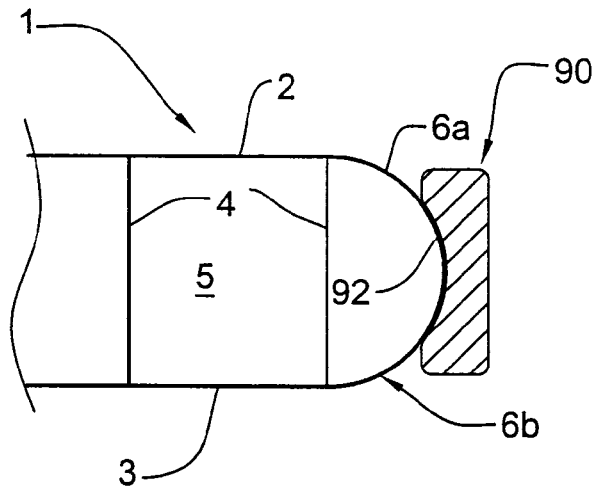
FIG. 12C schematically illustrates a side profile of the fluted panel of FIG. 12A, with a pressing/cooling stage for cooling the end fused tabs while they are maintained in a desired end configuration.

Another aspect of the present invention is a method of closing an edge of a product, such as the panel 1. The method can include a step of rolling at least one of the upper and lower layers toward the other layer so that they contact and fuse them together by heating. Fusing can take place at their edges (butt fusing) as illustrated in FIGS. 12A-12C, at their slightly overlapped edges (not illustrated), or at the overlapped portions as illustrated in FIGS. 1-6 and 10-10C. In this respect, at least a portion of the one layer that abuts, contacts, or overlaps the other layer and a portion of the other layer abutting, contacting, or being overlapped with the one layer can be heated. Preferably, both abutting, contacting, or overlapping portions can be heated to allow easier fusing or bonding.

Figure 1A:
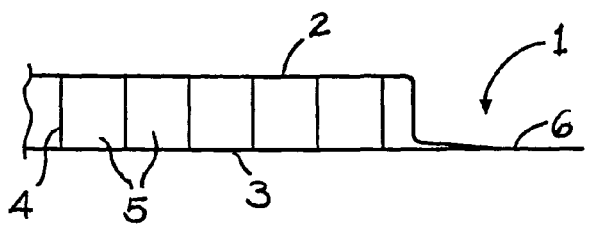
FIG. 1A schematically illustrates a side profile of the fluted panel similar to FIG. 1, but with the upper skin edge bonded or fused to a tab formed by the lower layer.

Referring to FIG. 1, the method can further include the step of preparing at least one layer so that one of the upper and lower layers 2, 3 extends beyond the other by a predetermined length. This can be accomplished by machining or trimming one or both ends of the upper and lower layers so that the one layer extends beyond the other layer to form a tab 6, as illustrated in FIG. 1. Alternatively, one of the layers 2, 3 can be pressed and heat fused to the other layer to form a tab 6, as illustrated in FIG. 1A.

In either embodiments, only one layer can be trimmed, cut, or machined as needed. Moreover, if needed, one or more flutes 4 can be removed, such as by cutting, trimming, or machining, to form a tab 6 of sufficient dimension in the one layer. Indeed, trimming an end running along the width direction requires removal of flutes 4, as well as trimming the end of at least one of the upper and lower layers 2, 3.

Figure 6:
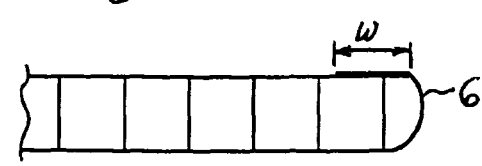
FIG. 6 schematically illustrates a side profile of the fluted panel of FIG. 1, with the tab fully folded over and fused to the upper skin.

In any event, the tab 6 can be dimension so that it overlaps an edge portion x of the other layer. In the embodiment of FIGS. 1-6, the lower layer 3 is illustrated as having the tab. Referring to FIGS. 3 and 6, the overlapping portion y of the tab 6 has a predetermined length l that overlaps the overlapped portion x of the upper layer 2. The overlapped portion x has a width w that is substantially equal to the length l.

The edge preparing step can be achieved with the trimming stage, which can comprise any conventional machine, such as a knife, rotating blade, saw, router, etc. (not shown), suitable for trimming either or both the upper and lower layers 2, 3, as well as any flutes 4 provided therewith. For instance, the trimming stage can be configured to simultaneously cut the upper and lower layers 2, 3 to provide smooth and even edges. Then, on a second pass, the trimming stage can trim the upper layer 2, along with any flutes 4 necessary to form the tab 6 on the lower layer 3 having a sufficient length to overlap the upper layer 2, or vice-versa. The trimming stage can move relative to a stationary panel 1 or vice versa, or both can move relative to each other during the trimming step.

Figure 2:
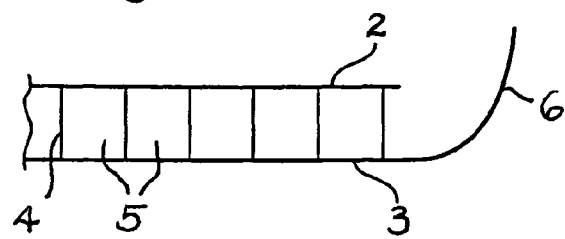
FIG. 2 schematically illustrates a side profile of the fluted panel of FIG. 1, with the tab partially bent or folded toward the upper layer.
Figure 3:
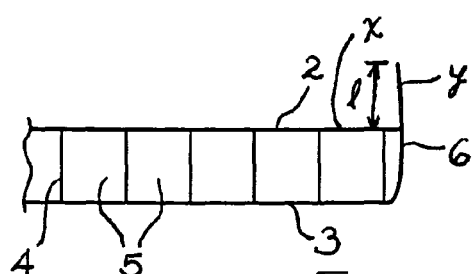
FIG. 3 schematically illustrates a side profile of the fluted panel of FIG. 1, with the tab fully folded toward the upper layer.
Figure 4:
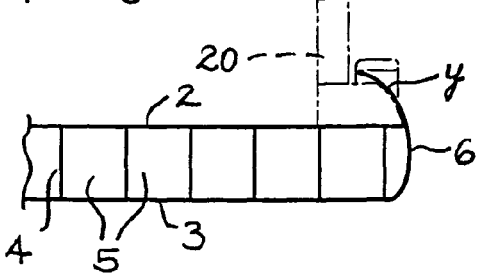
FIG. 4 schematically illustrates a side profile of the fluted panel of FIG. 1, with the tab further folded downwardly toward the upper layer with a overlapping and fusing stage (shown in phantom).
Figure 5:
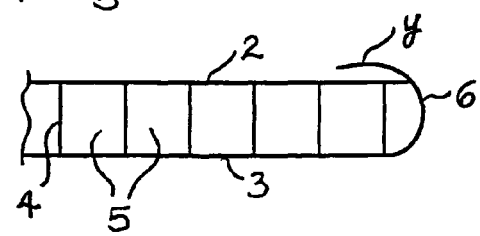
FIG. 5 schematically illustrates a side profile of the fluted panel of FIG. 1, with the tab almost fully folded over the upper layer.
Figure 7:
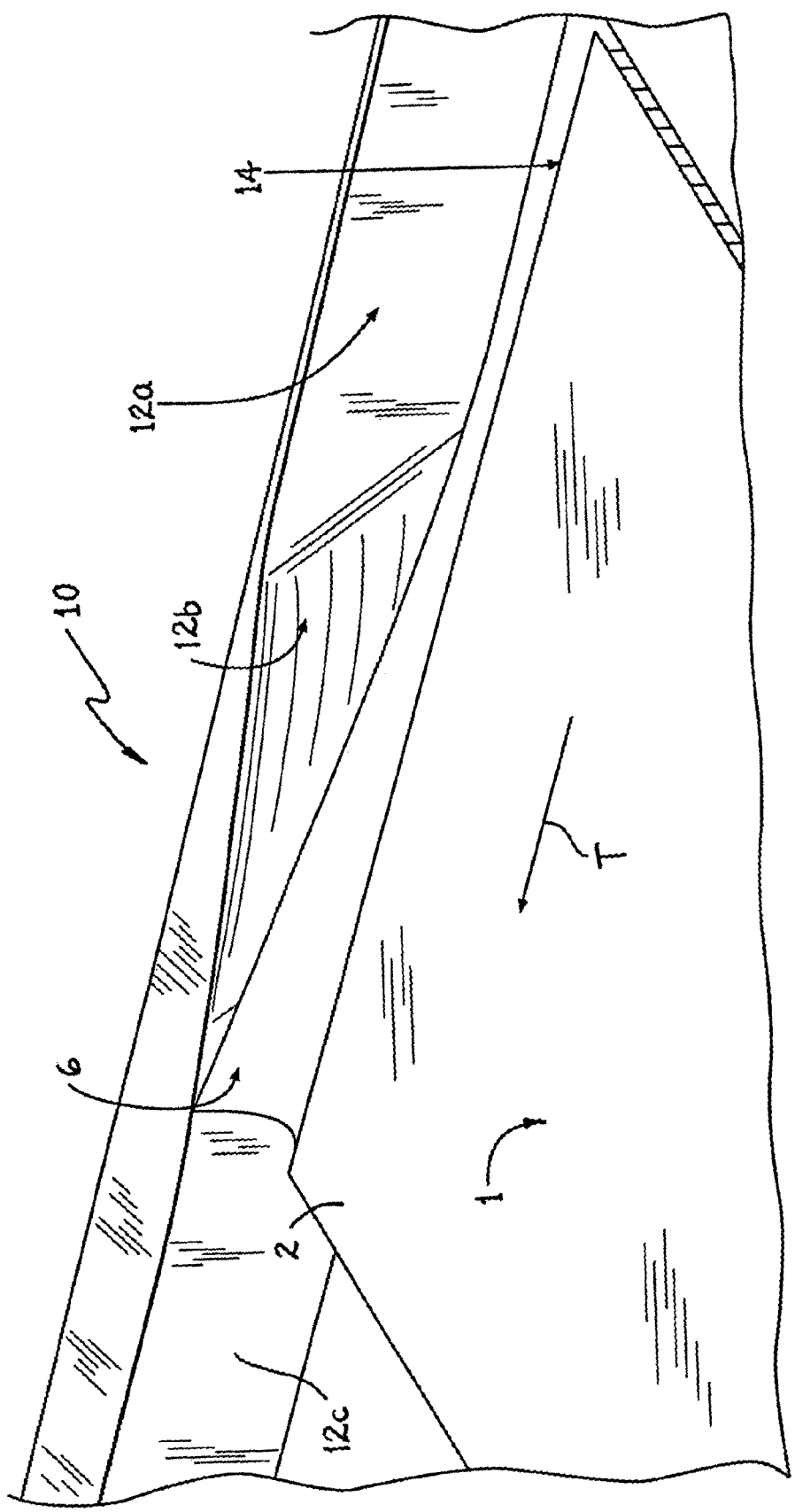
FIG. 7 schematically illustrates a bending stage for bending or folding the tab to the position shown in FIG. 3.

Referring to FIGS. 2, 3, and 7, the rolling step can further include a step of pre-rolling or bending the tab 6 toward the upper layer 2. Here, the tab 6 is bent or rolled so that the overlapping portion y is adjacent to and extending substantially perpendicularly to the overlapped portion x. The tab 6 can be heated to make it pliable before it is rolled. This is particularly important when the layer is thicker.

Figure 9:
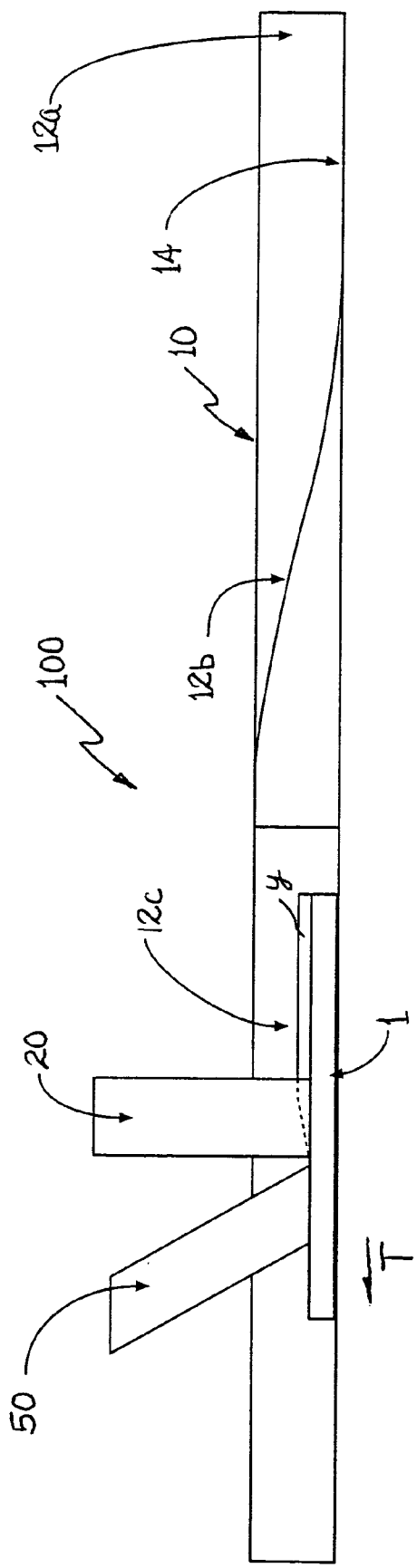
FIG. 9 schematically illustrates an apparatus incorporating the bending/fusing/pressing/cooling stages of FIGS. 7 and 8 for closing an open end of a panel.

Referring to FIGS. 7 and 9, the bending step can be achieved with the bending stage 10. The bending stage 10 can comprise first, second, and third sections 12a, 12b, and 12c. The first section 12a has a first upright surface that is positioned substantially perpendicular to the tab 6. The second section 12b has a guide surface that is contoured or arcuated to guide and roll the tab 6 toward the upper layer while either the panel 1 or the apparatus 100 is moved relative to the other. In this respect, the guide surface of the second section 12b moves closer toward the upper layer as the panel 1 is moved in the traveling or downstream direction T. The third section 12c has a second upright surface that is configured to maintain the tab 6 in the upright position shown in FIG. 3. In this respect, the second upright surface abuts the outer side of the tab 6.

In the illustrated embodiment, the panel 1 is moved relative to the stationary apparatus 100 in the direction T, as illustrated in FIG. 7. The present invention also encompasses, moving the apparatus 100 relative to the panel 1 instead, or even moving both.

To more easily roll or bend the tab 6, the bending stage 10 can include a heater 14 configured to heat at least the first section 12a. The heater 14 can be configured to heat the tab 6 from its underside/outerside or innerside (the upwardly facing side in FIG. 7) or both, while the apparatus 100 or the panel 1 moves relative to the other. The heater 14 also can be configured to heat the entire length of the bending stage 10, to keep the tab 6 in a pliable condition. The heater 14 can be any conventional temperature controlled heater that generates sufficient heat to make the tab 6 pliable. For instance, polypropylene melts at 324 F. The heater, depending on the thickness and the relative speed to which the tab 6 moves relative to the heater, should have a capability of heating higher than 324 F. The key is to transfer sufficient amount of heat while the panel 1 or the apparatus 100 is moving relative to the other so that the tab 6 becomes pliable, but not to hot as to melt or make the tab 6 too soft to hold its shape.

The rolling step can further include overlapping the tab 6 onto the upper layer 2. In this regard, at least one of the overlapping and overlapped portion y, x can be heated. Preferably, to achieve good seal and bond, both bonding or fusing surfaces, namely the overlapping portion y of the tab 6 and the overlapped portion x of the other layer, can be heated simultaneously. This allows the overlapping portion y to instantaneously fuse with the overlapped portion x upon contact, with a minimal pressure. This advantageously fuses without crushing or collapsing the upper and lower layers 2, 3, and allows formation of contoured or rounded fused area.

Figure 8:
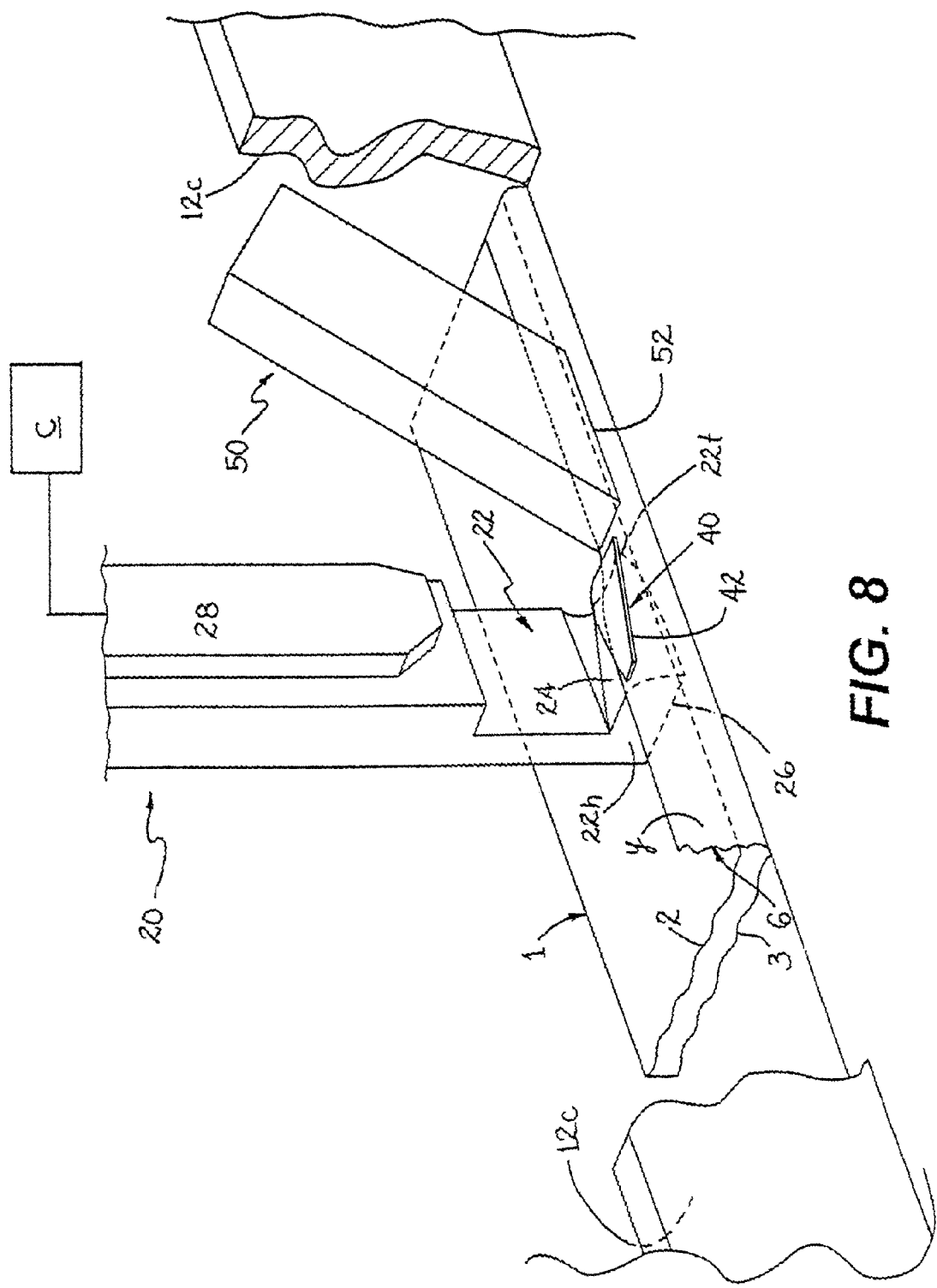
FIG. 8 schematically illustrates a fusing stage for rolling and fusing the tab on the upper skin and a pressing/cooling stage for cooling the fused tab while pressing it flat.

Referring to FIGS. 8 and 9, the fusing step can be achieved with the fusing stage 20. The fusing stage 20 can include a heated body or shoe 22 having first and second guide surfaces 24, 26. The second guide surface 26 is positioned substantially opposite the first guide surface 24. The first guide surface 24 is contoured to contact and heat the contact side of the overlapping portion y of the tab 6, while the second guide surface 26 is configured to contact and heat the contacting side of the overlapped portion x of the upper layer 2. In this respect, the shoe 22 has or carries a temperature controlled heater or heating element 28 (with a controller C) for heating the shoe 22. The second upright surface of the third section 12a can extend continuously into the fusing stage 20 so it abuts against the outer side of the tab 6 and keep the tab 6 at a substantially right angle with respect to the upper layer. In this respect, the tab 6 can be continuously heated throughout the bending and fusing stages 10, 20. Indeed, continuously heating the tab 6 keeps the tab hot and pliable so that less heating time is needed in the fusing stage, which requires heating to a higher temperature to melt the areas to be fused.

The fusing stage 20 can further include a complementary guide 40 for guiding the overlapping portion y of the tab 26 over the first guide surface 24. The guide 40 extends laterally outwardly and downwardly from the second upright surface of the third section 12c, adjacent to the first guide surface 24 of the shoe 22. The guide 40 and the second upright surface of the third section 12c surround the outer side of the tab 6. The guide 40 has a complementary surface 42 opposite the first guide surface 24 that is substantially complementary to and positioned hovering over the first guide surface 24. The guide 40 works much like a binder attachment on a sewing machine. That is, the guide surfaces 24, 42 pinch or sandwich the overlapping portion y of the tab 6 therebetween, between the heel portion (upstream) 22h and the toe portion (downstream) 22t of the shoe 22. The complementary surface 42 is configured to guide the overlapping portion y over the overlapped portion x so that the overlapping portion y contacts and fuses to the overlapped portion x as the tab 6 emerges from the toe section 22t (while one of the apparatus 100 and the panel 1 is moved relative to the other). In other words, the guide 40 wraps the overlapping portion y of the tab over onto the top of the toe portion 22t as the panel 1 moves relative to the guide 40 to position the overlapping portion y to the positions shown in FIGS. 4-5.

The second guide surface 26 of the shoe 22 heats the contacting side of the overlapped portion x of the upper skin 2 while the first guide surface 24 simultaneously heats the contacting side of the overlapping portion y. As the heated tab 6 slides off the toe portion 22t of the shoe 22, the guide surface 42 puts a slight pressure to the top of the overlapping portion y to allow the melted surfaces to fuse, as shown in FIG. 6. The fusing occurs immediately downstream of the toe portion 22t.

As an example, the shoe 22 can be heated to 425° F., which is greater than the melting point of polyethylene or polypropylene, while one of the panel 1 and the apparatus 100 is removed relative to the other at 10 ft/min, for a tab having a thickness of between 6.5 to 10 mil, to achieve a good weld. The temperature of the shoe 22 to be maintained depends on the speed at which the panel 1 moves relative to the shoe 22, the thickness of the layers to be fused, and the particular material of the layers to be fused. The faster the panel 1 is moved relative to the shoe 22, the higher the temperature of the shoe 22 need to be, and vice-versa, required to melt the surfaces to be fused. Moreover, the thicker the layers to be fused, the higher the temperature of the shoe 22 needs to be, and vice-versa. The particular temperature setting and the speed to which the panel 1 is moved relative to the apparatus 100 is well within the ambit of an ordinary artisan, given the present disclosure. Moreover, the heating surfaces, namely the first and second guide surfaces 24, 26 preferably have a non-stick coating, such as Teflon or the like, or any other conventional material having such properties.

The method can further include a step of applying pressure to and cooling the fused tab 6. Applying pressure flattens any wrinkles and assures good weld. Cooling assures that the weld does not become separated to maintain a good seal. This step can be achieved with a pressing/cooling stage 50. The pressing/cooling stage 50 is positioned immediately upstream of the fusing stage 20, adjacent to the foot portion 22t of the shoe 22. The pressing/cooling stage 50 has a guide surface 52 configured to contact and depress the outer side of the fused tab 6 to ensure that fused tab 6 stays fused. Moreover, the device 50 can further include a cooling device, such as a fan, a Peltier device, or water or air-cooled heat sink for rapidly dissipating heat.

According to another aspect of the present invention, the method can include rolling, folding, or moving both the upper and lower layers toward one another so that one of the upper and lower layers overlaps the other, while heating at least one of the upper and lower layers. After heating, the layers are further rolled, folded, or moved so that they contact and fuse, as shown in FIGS. 10-11.

Figure 10A:
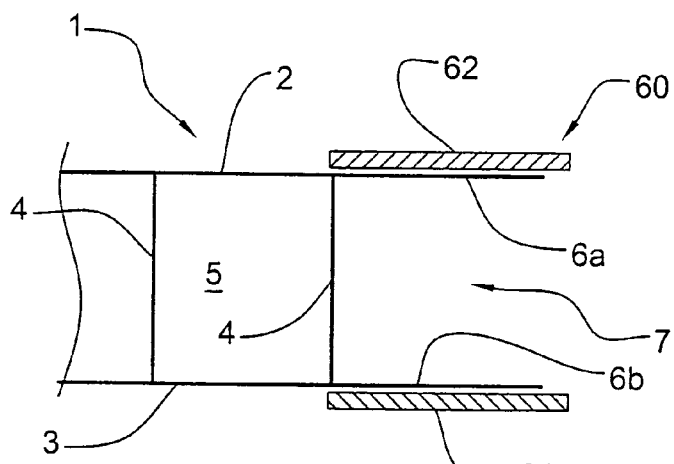
FIG. 10A schematically illustrates a side profile of the fluted panel of FIG. 10, with a fusing stage just before it contacts and guides the tabs.

In this alternative embodiment, although only one surface need be heated, preferably, both of the contacting surfaces can be heated so that they fuse instantaneously upon contact with a minimal pressure. Here, the edge preparing step can be achieved with the same trimming stage described above. The trimming stage can be configured to simultaneously cut the upper and lower layers 2, 3 to provide equal length tabs 6a, 6b. The rolling/fusing steps can be achieved with a fusing stage 60, which can include a pair of first and second guides 62, 64 positioned parallel to the tabs 6a, 6b, as shown in FIG. 10A (which is the initial stage, just before the guides starts to bend or roll the tabs). The fusing stage 60 is shown with two heaters H1, H2 associated with the first and second guides 62, 64, respectively, although only one heater is needed. These heaters H1, H2 have an associated controller C for independently controlling the heaters.

Figure 10B:
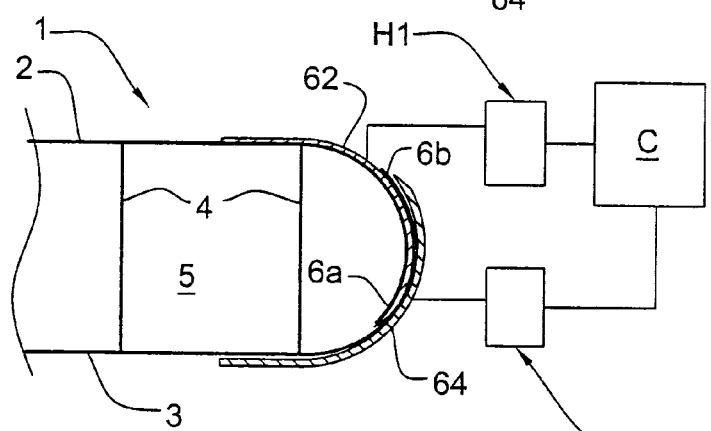
FIG. 10B schematically illustrates a side profile of the fluted panel of FIG. 10, with the fusing stage at a different position, where it guides the tabs so that they are in an overlapping configuration.

The guides 62, 64 guide and configure the tabs 6a, 6b as illustrated in FIG. 10B (which is at near the end of the fusing stage). In this configuration, one of the first and second guides 62, 64 are positioned inwardly of the other. Only the inwardly positioned guide (62 as illustrated) needs to be heated to a temperature sufficient to melt the tabs 6a, 6b since it advantageously contacts both fusing surfaces of the tabs 6a, 6b. The outwardly positioned guide 64 need only be heated to allow the respective tab 6b to become sufficiently pliable. It is possible to do without the second heater H2 for the outwardly positioned tab, depending on the thickness of the tab 6b.

Figure 11:
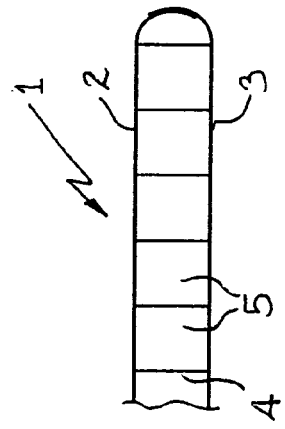
FIG. 11 schematically illustrates a side profile of the finished fluted panel of FIG. 10 with the tabs overlapped and fused together.
Figure 10C:
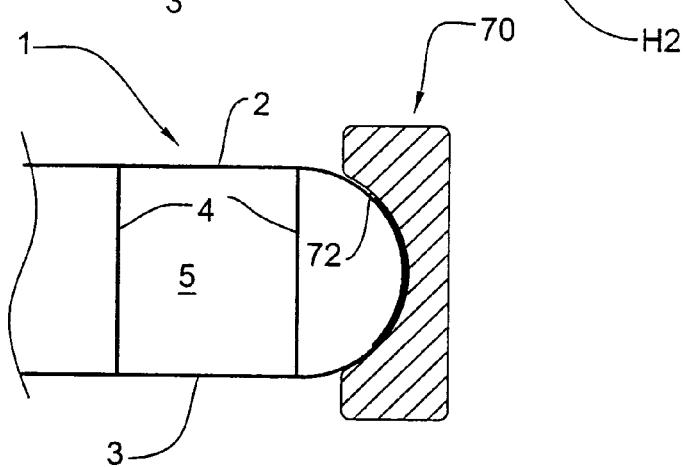
FIG. 10C schematically illustrates a side profile of the fluted panel of FIG. 10, with a pressing/cooling stage for cooling the fused tabs while they are maintained in a desired end configuration.

The apparatus can further include a pressing/cooling stage 70, which includes a guide surface 72 contoured to be complementary to the shape (substantially hemispherical as illustrated in FIGS. 10C and 11) of the finished end for pressing and cooling the fused tabs.

According to yet another aspect of the present invention, the method can include rolling, folding, or moving at least one of the upper and lower layers 2, 3 toward the other so that the upper and lower layers contact one another, while heating at least one of the upper and lower layers. Here, either the edges abuttingly contact each other to form a butt joint or the edges can be slightly overlappingly joined. Depending on the desired end shape, both the upper and lower layers 2, 3, can be rolled, folded, or moved toward one another so that the upper and lower layers contact one another, as illustrated in FIGS. 12A-12C. Again, the fusing can be butt type or slightly overlapping type.

Here, the edge preparing step can be achieved with the same trimming stage described above. The trimming stage can be configured to simultaneously cut the upper and lower layers 2, 3 to provide equal length tabs 6a, 6b, but dimensioned so that the final configuration has only the edges abutting. The rolling/fusing steps can be achieved with a using stage 80, which can include a pair of first and second guides 82, 84 positioned parallel to the tabs 6a, 6b, as shown in FIG. 12A (which is the initial stage, just before the guides starts to bend or roll the tabs), similar to FIG. 10A. The fusing stage 80 is also shown with two heaters H1, H2 associated with the first and second guides 82, 84, respectively, although only one heater is needed. These heaters H1, H2 have an associated controller C for independently controlling the heaters.

The guides 82, 84 guide and configure the tabs 6a, 6b as illustrated in FIG. 12B (which is at near the end of the fusing stage). In this configuration, one of the first and second guides 82, 84 are positioned to wrap around beyond the seam, as illustrated in FIG. 12B. In this configuration, only that guide (82 as illustrated) needs to be heated sufficient to melt the abutting edges. The other guide 84 need only be heated to allow the respective tab 6b to become sufficiently pliable. It is possible to do without the second heater H2, depending on the thickness of the tab 6b.

The apparatus can further include a pressing/cooling stage 90, which includes a guide surface 92 contoured to be complementary to the shape (substantially hemispherical as illustrated in FIG. 12C) of the finished end for pressing and cooling the fused tabs.

The fusing step and stage has been disclosed in terms of heating the tab 6 and the first skin 2. In this regard, there are many ways of apply heat: an electrical heating element and ultrasonic welding, for example. The electrical heating element is universally available, which includes a resistance element that heats up when current flows through it. The ultrasonic welding generates heat with vibration.

This method and apparatus according to the present invention can be used to finish the ends so that it is esthetically pleasing, inconspicuous, and results in a smooth rounded edge much like as if a bullnose were fabricated out of a solid material. The economics of the present method and apparatus are excellent as the edges can be finished quickly in a continuous process and the equipment is very inexpensive and universal. Moreover, the ends need not be adapted to any specific shapes.

I claim:

1. A method of closing an open end of a ribbed thermoplastic panel having a first layer with a first end and a second layer with a second end, the first layer being spaced apart from the second layer by a rib directly interconnected therewith and extending from the first layer to the second layer, the first and second ends defining the open end, the first and second layers being heat weldable or fusable, wherein the rib is formed of a thermoplastic material, the method comprising steps of:

rolling at least the first layer between spaced first and second guides configured to contact the first layer and guide the first layer along a heated guide surface toward the second layer, the rolling occurring along an arcuate surface to reorient the first layer with respect to the second layer such that the first layer contacts the second layer, and simultaneously moving the second layer to contact the first guide;

fusing the first and second layers by heating at least one of a portion of the first layer that contacts the second layer and a portion of the second layer that contacts the first layer to form a closed end extending proximate an edge of the ribbed thermoplastic panel and to define a space between the rib and the closed end.

2. A method according to claim 1, wherein the rolling step includes overlapping the first layer over the second layer.

3. A method according to claim 1, wherein the rolling step includes rolling both the first and second layers so that the first layer overlaps and contacts the second layer.

4. A method according to claim 1, wherein the fusing step includes heating portions of both the first and second layers that contact each other.

5. A method according to claim 4, wherein the portions of both the first and second layers that contact each other are simultaneously heated.

6. A method according to claim 2, further including a step of trimming at least the second layer so that the first layer extends beyond the second layer to form a tab, the tab being dimensioned to overlap the second layer.

7. A method according to claim 1, further including a step of trimming the first and second layers so that the first and second layers extend substantially equally.

8. A method according to claim 3, further including a step of trimming the first and second layers so that the first and second layers extend substantially equally.

9. A method according to claim 1, further including a step of pressing and cooling the fused layers.

10. A method according to claim 1, wherein the ribbed thermoplastic panel is formed of a material selected from the group consisting of polypropylene, polyethylene, and polycarbonate.

11. A method of closing an open end of a corrugated thermoplastic panel having a first layer with a first free end and a second layer with a second free end, the first layer being spaced from the second layer by a rib extending therebetween directly from the first layer to the second layer, the first and second free ends defining a first open end, and the first and second layers being heat sealable to each other, wherein the rib is formed of a thermoplastic material, the method comprising:

rolling the first free end between spaced first and second guides configured to contact and guide the first layer along a guide surface, and simultaneously moving the second layer to contact the first guide, with the first guide comprising a heated body, so that a first edge portion of the first layer bends and abuts a second edge portion of the second layer, wherein the guiding occurs so that prior to abutting each other the first edge portion of the first layer and the second edge portion of the second layer directly contact the heated body;

heat sealing the abutting first and second edge portions to each other to form a closed end extending proximate an edge of the corrugated thermoplastic panel and to define a space between the rib and the closed end.

12. The method of claim 11, wherein the rib defines a spacing and the first and second edge portions overlap at a position along the spacing.

13. The method of claim 11, wherein the corrugated thermoplastic panel comprises a second open end disposed opposite the first open end, the first free end is guided so that the first edge portion extends toward the second open end, and the first and second edge portions overlap.

14. The method of claim 11, further comprising:
trimming the second layer to have a second length defined between the rib and the second free end;
wherein the first layer has a first length defined between the rib and the first free end, and the second length is shorter than the first length.

15. The method of claim 11, further comprising:
guiding the second free end so that the second edge portion bends.

16. The method of claim 11, wherein heat for the heat sealing is provided by an electrical heating element.

17. A method of closing an open end of a corrugated thermoplastic panel having a first layer with a first free end and a second layer with a second free end, the first layer being spaced from the second layer by a member extending therebetween directly from the first layer to the second layer, the first and second free ends defining a first open end, the first and second layers being heat sealable to each other, and the corrugated thermoplastic panel further having a plurality of interior open regions, wherein the member is formed of a thermoplastic material, the method comprising:
rolling the first free end between spaced first and second guides configured to contact and guide the first layer along a guide surface, and simultaneously moving the second layer to contact the first guide, with the first guide comprising a heated body, so that a first surface portion of the first layer bends and abuts a second surface portion of the second layer, wherein the guiding occurs so that prior to the first and second surface portions abutting one another, the first and second surface portions directly contact the heated body;
heat sealing the abutting first and second surface portions to each other to form a closed end extending proximate an edge of the thermoplastic panel and to define a space between the member and the closed end.

18. The method of claim 17, wherein the member defines a spacing between the first and second layers and the first and second surface portions overlap at a position along the spacing.

19. The method of claim 17, wherein the corrugated thermoplastic panel comprises a second open end disposed opposite the first open end, the first free end is guided so that the first surface portion extends toward the second open end, and the first and second surface portions overlap.

20. The method of claim 17, further comprising:
trimming the second layer to have a second length defined between the member and the second free end;
wherein the first layer has a first length defined between the member and the first free end, and the second length is shorter than the first length.

21. The method of claim 17, further comprising:
guiding the second free end so that the second surface portion bends.

22. The method of claim 17, wherein heat for the heat sealing is provided by an electrical heating element.

23. A method of closing an open end of a hollow core thermoplastic panel having a first layer with a first outer surface and a first end and a second layer with a second outer surface and a second end, the first layer being spaced apart from the second layer by a member directly interconnected therewith and extending from the first layer to the second layer, the first and second ends defining the open end, the first and second outer surfaces being heat sealable, wherein at least one of the first and second layers extends beyond the member at the open end, wherein at least the first and second outer surface layers are formed of a thermoplastic material, the method comprising:
rolling at least the first layer between spaced first and second guides configured to contact the first layer and guide the first layer along a heated guide surface toward the second layer while moving the second layer to also contact the first guide, with the first guide being configured as a shoe, and contacting the first outer surface with the second outer surface along bonding regions thereof by the rolling along an arcuate surface to reorient the first layer with respect to the second layer such that the first layer contacts the second layer;
fusing the first and second layers by heating at least one of the bonding regions of the first and second outer surfaces to form a closed end extending proximate an edge of the hollow core thermoplastic panel and to define a space between the member and the closed end.

24. The method of claim 23 wherein the thermoplastic material is flexible.

* * * * *